US009195660B2

(12) United States Patent
David et al.

(10) Patent No.: US 9,195,660 B2
(45) Date of Patent: Nov. 24, 2015

(54) CONTEXTUAL SEARCH FOR MODELING NOTATIONS

(75) Inventors: Amid David, Kiryat Ata (IL);
Anaby-Tavor Ateret, Givat-Ada (IL);
Boaz David, Bahan (IL); Limonad Lior,
Nesher (IL)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 13/304,709

(22) Filed: Nov. 28, 2011

(65) Prior Publication Data
US 2013/0138423 A1   May 30, 2013

(51) Int. Cl.
*G06F 17/27* (2006.01)
*G06F 17/30* (2006.01)

(52) U.S. Cl.
CPC ............... *G06F 17/30011* (2013.01)

(58) Field of Classification Search
CPC .......... G06F 17/3089; G06F 17/30265; G06F 17/30277; G06F 17/2705; G06F 17/30256; G06F 17/30395; G06Q 10/10; G06K 9/4642; G06K 9/4685; G06T 11/60; H04L 51/16
USPC ........ 348/231.3; 382/224; 717/105; 715/752; 707/772, 723, 706; 706/12; 705/7.32; 704/8, 275; 455/418; 434/156; 345/619
See application file for complete search history.

(56) References Cited

U.S. PATENT DOCUMENTS

| 6,970,859 | B1 * | 11/2005 | Brechner et al. ............. 1/1 |
| 7,506,263 | B1 * | 3/2009 | Johnston et al. .......... 715/752 |
| 7,693,901 | B2 * | 4/2010 | Ka et al. .................... 707/723 |
| 8,510,117 | B2 * | 8/2013 | Agapi et al. ................ 704/275 |
| 2002/0120784 | A1 | 8/2002 | Rajarajan et al. |
| 2003/0031987 | A1 * | 2/2003 | Gore et al. ................. 434/156 |
| 2004/0088328 | A1 * | 5/2004 | Cook et al. ............... 707/104.1 |
| 2006/0069545 | A1 * | 3/2006 | Wu et al. ...................... 704/8 |
| 2008/0313572 | A1 | 12/2008 | Waldman et al. |
| 2009/0060351 | A1 * | 3/2009 | Li et al. .................... 382/224 |
| 2009/0259731 | A1 | 10/2009 | Luk et al. |
| 2009/0287655 | A1 * | 11/2009 | Bennett ........................ 707/3 |
| 2010/0159909 | A1 * | 6/2010 | Stifelman ................. 455/418 |
| 2010/0228691 | A1 * | 9/2010 | Yang et al. ................ 706/12 |
| 2010/0318929 | A1 | 12/2010 | Hilton et al. |
| 2010/0325605 | A1 * | 12/2010 | Ding et al. ................ 717/105 |

(Continued)

FOREIGN PATENT DOCUMENTS

JP   2002342344   11/2002

OTHER PUBLICATIONS

Chock et al., "Automatic generation of intelligent diagram editors", ACM Transactions on Computer-Human Interaction, vol. 10, No. 3, pp. 244-276, Sep. 2003.
Costagliola et al., "A framework for modeling and implementing visual notations with applications to software engineering" ,ACM Transactions on Software Engineering and Methodology, vol. 13 Issue 4, Oct. 2004.

(Continued)

*Primary Examiner* — Michael Colucci
(74) *Attorney, Agent, or Firm* — Ziv Glazberg, Esq.

(57) ABSTRACT

A method, an apparatus, and a computer program product for contextual-based search of modeling notations to be used in a model. The method comprises obtaining a contextual property of a notation to be used in a diagram, wherein the contextual property defines a context of a usage of the notation in the diagram; and searching in a notation-base for notations, whereby a search result set is obtained, wherein the search result set comprises notations that were previously used in a similar context to the contextual property, wherein the notation-base is stored in a data storage.

20 Claims, 3 Drawing Sheets

(56) References Cited

U.S. PATENT DOCUMENTS

| | | | |
|---|---|---|---|
| 2012/0120097 A1* | 5/2012 | Sun et al. | 345/619 |
| 2012/0232954 A1* | 9/2012 | Calman et al. | 705/7.32 |
| 2013/0013578 A1* | 1/2013 | Yang et al. | 707/706 |
| 2015/0161175 A1* | 6/2015 | Yee et al. | 707/772 |

OTHER PUBLICATIONS

Daniel L. Moody, "The "Physics" of Notations: Toward a Scientific Basis for Constructing Visual Notations in Software Engineering", IEEE Transactions on Software Engineering, vol. 35, No. 6, pp. 756-779, Nov./Dec. 2009.

* cited by examiner

CONTEXTUAL SEARCH FOR MODELING NOTATIONS

TECHNICAL FIELD

The present disclosure relates generally to formal and informal modeling using graphical representation and, more particularly to annotation selection to be used in a diagram.

BACKGROUND

Diagrams are often used to facilitate communication and understanding in various domains of interests.

In the present disclosure a "diagram" or a "model" is a visual illustration adhering a grammar of a modeling language. The grammar may be formal or informal, and the diagram may loosely adhere to it. Such modeling languages may be specified as a combination of the concrete syntax (i.e., graphical symbols), the abstract syntax (i.e., linguistic constructs), and a set of rules.

Model authors choose their notations from an arbitrary set of graphic symbols. However, some notations are often used for the same purpose. For example, a symbol of a cloud may often be used to represent the Internet, and thus when people view a model and see a cloud they may infer that it represents the Internet without having to review the legend or associated text.

BRIEF SUMMARY

One exemplary embodiment of the disclosed subject matter is a computer-implemented method performed by a processor, the method comprising: obtaining a contextual property of a notation to be used in a diagram, wherein the contextual property defines a context of a usage of the notation in the diagram; and searching in a notation-base for notations, whereby a search result set is obtained, wherein the search result set comprises notations that were previously used in a similar context to the contextual property, wherein the notation-base is stored in a data storage.

Another exemplary embodiment of the disclosed subject matter is a computerized apparatus comprising: a processor which is arranged to: obtain a contextual property of a notation to be used in a diagram, wherein the contextual property defines a context of a usage of the notation in the diagram; and search in a notation-base for notations, whereby a search result set is obtained, wherein the search result set comprises notations that were previously used in a similar context to the contextual property; and wherein the computerized apparatus is operatively coupled to the notation-base.

Yet another exemplary embodiment of the disclosed subject matter is a computer program product comprising: a non-transitory computer readable medium; a first program instruction for obtaining a contextual property of a notation to be used in a diagram, wherein the contextual property defines a context of a usage of the notation in the diagram; a second program instruction for searching in a notation-base for notations, whereby a search result set is obtained, wherein the search result set comprises notations that were previously used in a similar context to the contextual property, wherein the notation-base is stored in a data storage; and wherein said first, second, and third program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
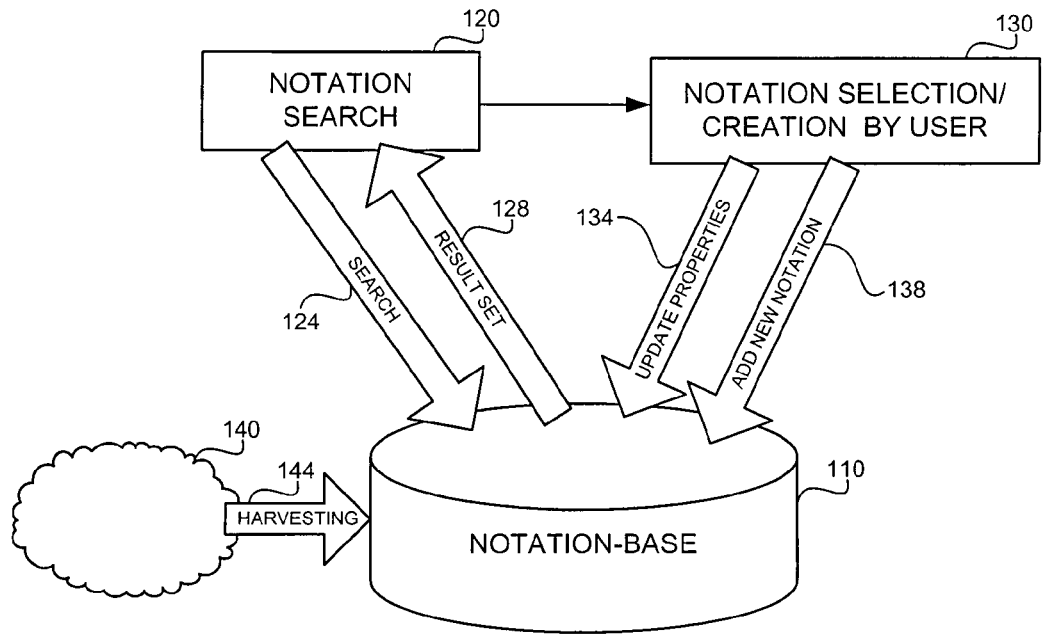
FIG. 1A shows an illustration of a process for notation selection, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to assist an author to use the most effective notations for a modeling script, which best represents for the audience the underlying modeling meaning assigned to it.

One technical solution is to monitor contextual properties associated with usage of notations in models. Another technical solution is to provide a contextual property based search of a notation-base, thus providing as results notations that were previously used for similar purposes. Yet another technical solution is to rank search results based on a past usage ranking criterion.

The disclosed subject matter may be used to determine that the most widely used illustration of the "Internet" is a cloud shape. Similarly, the most widely used illustration for "strategy" is a "target" shape. Furthermore, based on an affiliation of an author of the model, different shapes may be determined For example, the term "us" may have a different meaning in different companies. As another example, the term "memory" may be represented by different illustrations in different domains (e.g., a memory chip in a computer science domain v a brain in psychology domain).

One technical effect of utilizing the disclosed subject matter is improving effectiveness of notations. The disclosed subject matter enables selection of notations that most faithfully represent for the intended audience the underlying modeling meaning assigned to it.

Another technical effect is an increase in the repertoire of notations available to model authors when creating new modeling languages. The notation-base is updated with new notations and contextual information, thus accumulating collaborative contextual information of the notations.

Yet another effect is the creation of ad-hoc standards of notation usage. Upon the addition of new concepts, collaborative identification of notations to represent the new concepts is determined and recorded. The selected notations are promoted to be used by different authors and thus become an ad-hoc standard. Furthermore, the ad-hoc standards may be modified over time. For example, if a display used to be represented using a notation of a CRT, over time more and more authors use an LCD notation to represent the display and thus the ad-hoc standard is modified. The disclosed subject matter enables the creation and modification of an ad-hoc standard, which may vary between different domains and affiliations.

Yet another effect is a peer-production method of selecting notations to be used for a desired contextual intent. The disclosed subject matter may perform crowd-sourcing to determine an underlying meaning of notations based on usage thereof in similar models. Activity of authors may be monitored interactively and the underlying meaning of each notation may be updated based on new usages thereof.

FIG. 1A shows an illustration of a process for notation selection, in accordance with some exemplary embodiments of the disclosed subject matter.

A Notation-base 110, such as retained in a data storage device, data server, network associated storage, or the like, may comprise a repository of notations useful in models and contextual information of usage thereof. In some exemplary embodiments, Notation-base 110 is based on a batch process of harvesting (144) a set of models, available in digital form, such as, for example, publicly available in the Internet 140. The harvesting process 144 may obtain a variety of existing models and for each such model index contextual properties of the model and elements comprised thereof. In some exemplary embodiments, the variety is a representative sample of conceptual modeling for one or more target domains.

In some exemplary embodiments, for a given model graphic symbols an associated descriptive text may be identified. Associated descriptive text may be identified in an associated textual label, in a text label that is placed in proximity of the graphic symbol or the like. The associated text may be useful for identifying underlying meaning of the symbol. As another example, text appearing on a first slide of a presentation which in many cases includes the venue where it is presented, author affiliation, title of a slide, title of the model, and similar information may be extracted to determine contextual property of each notation used in the model. In some exemplary embodiments, contextual properties of a sibling model may be used, such as the case when two models are counterparts of one another (e.g., different views of a same process or apparatus), two models appear on two slides of the same presentation or two pages of the same file, or the like. Furthermore, metadata of a file retaining the model may be used, such as a creation timestamp, metadata regarding user creating or updating the file, a file name, or the like.

A notation search (120) may be performed by a model author (not shown). The Notation-base 110 may be searched (124) for notations that are in accordance with search parameters. A result set (128) may be retrieved and displayed to the author.

The author may then select one of the notations retrieved or use a different notation (130). In case the author uses a notation that was retrieved, Notation-base 110 may be updated (134) to reflect the context of usage that the author makes with the notation. Thus, Notation-base 110 may be improved to better suit the author's intent. Taking into account that many authors may search and use notations, Notation-base 110 may reflect cumulative underlying meaning of the notations, as collectively grasped by the authors.

Alternatively, the user may decide to use a different notation, such as one created by himself or obtained from a different source. Upon usage of the new notation, Notation-base 110 may be updated to include the new notation and contextual properties relating to usage thereof (138).

It will be noted that the contextual property of an underlying meaning of the notation may be determined without explicit user input. As opposed to prior art databases which retain sets of notations that are manually identified using relevant keywords, the disclosed subject matter does not require such a manual effort.

Figure 1B:
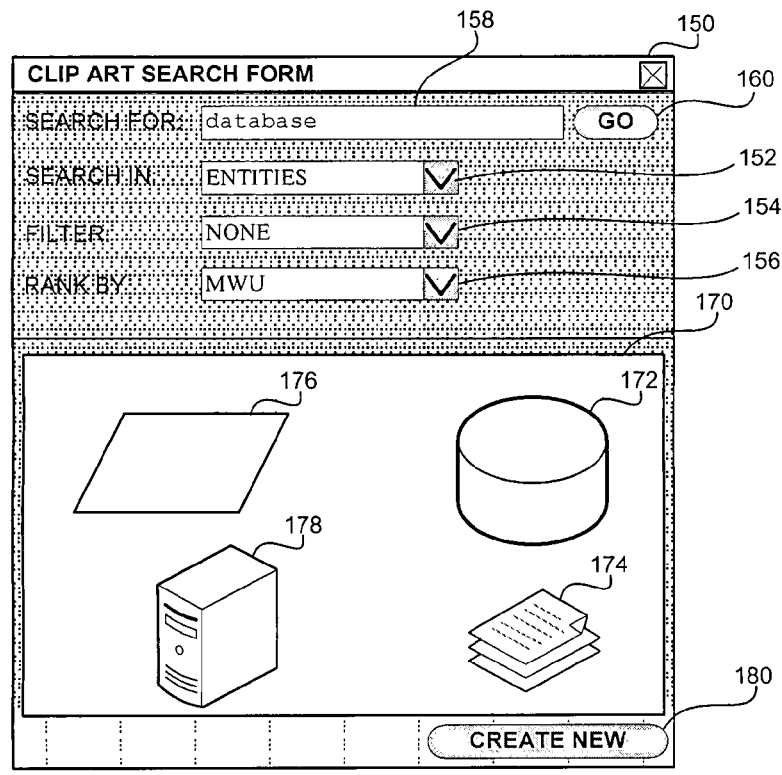
FIG. 1B shows an illustration of a search form user interface, in accordance with some exemplary embodiments of the disclosed subject matter.

FIG. 1B shows an illustration of a search form user interface, in accordance with some exemplary embodiments of the disclosed subject matter. A Search Form 150 is useful for an author that would like to search for a notation to be used in a model. Search Form 150 may enable a user to provide search input, such as keyword text, affiliation, ontological category, visual characteristics, or the like.

An Identifying String Field 158 may be used to provide a text indicative of a usage of the notation. Any text may be provided to indicate a desired underlying meaning of a notation. As an example, the string "database" may indicate searching for a notation that represents a database.

An Ontological Category Field 152 may be used to describe a type of symbol searched. Different ontologies may impose different ontological dimensions. In FIG. 1B the ontology differentiates between entities, relationships, actors, events and similar object types in the diagram. As opposed to the domain-neutral example given hereinabove, the ontology may be domain-specific. For example, in case of a diagram in the field of transportation, the ontology may be one of the following: a vehicle, an aircraft, a boat, etc.

A Filter Field 154 may be used to provide additional filtering criteria. As an example, desired visual characteristics of the notation may be provided, such as, color, grayscale, shape, dimension, iconic, pictures, size, or the like.

In some exemplary embodiments, additional fields may be used to provide search criteria. For example, an affiliation field may be used to select author's role, organization, industry, community, or similar affiliation. Thereby, the search may be tuned to provide results that are tailored to the author's affiliation. In addition, the results may better be suited to the domain of the model.

It will be noted that in the present example, Identifying String Field 158 and Ontological Category Field 152 may be utilized to obtain different contextual properties from the user regarding the searched notation.

In response to a user clicking a Go Button 160, search process (124) may commence and a result set (128) may be displayed in a Result Pane 170. As can be appreciated, different notations may be provided (172, 174, 176, 178). In some exemplary embodiments, a user may select (e.g., using an input device such as a pointing device) a notation out of Result Pane 170. Based on user's selection and desired properties in Search Form 150 Notation-base 110 may be updated (134). For example, in response to selection of notation 172, Notation-Base 110 may be updated to indicate that notation 172 is used to represent a database entity, in a domain of the model for which the selection was made, and by a user having the affiliation of the user that has selected notation 172. In some exemplary embodiments, usage of the selected notation is tracked and based thereon additional contextual properties may be extracted (e.g., affiliation, domain, and the like). Furthermore, based on usage of the notation, information that was not indicated in Search Form 150 may be determined, such as for example, underlying meaning of the notation as used (e.g., based on a text placed in proximity of the notation, it may be determined that the notation is used to represent a "datastore").

Additionally or alternatively, a user may decide not to select a notation from Result Pane 170. The user may create a new notation using a Create New Button 180. The user may draw a new notation, may select an existing image to be used as a notation, or the like. Upon addition of the new notation, the new notation may be added to Notation-base 110 (138). The new notation may be added with contextual properties which are based on the selections in Search Form 150 and/or actual usage of the new notation.

A Ranking Field 156 may be used to determine a metric to be used for ranking the result set in Result Pane 170. In some exemplary embodiments, Ranking Field 156 may enable a selection between Most Widely Used (MWU), Most Recently Used (MRU).

In some exemplary embodiments, MWU may be a metric in which total usage of the notation for the contextual property is measured. For example, the MWU may be a number of times in which the notation was used in a contextual property that as the desired contextual property defined by the user using Search Form 150. In some exemplary embodiments, it may be determined that different but substantially similar contexts of usage or considered the same as the desired contextual property. For example, a "datastore" notation may be deemed as the same as a "database" notation. Similarity of contextual properties may be based on rules, user preferences, or configurations.

In some exemplary embodiments, MRU may be a metric in which usage of the notation for the contextual property within a timeframe is measured. The MRU may be based on a timestamp of usage. The timestamp may be added during update (134) or addition (138). In some exemplary embodiments, a timestamp may be based on metadata time information of files harvested (144). In some exemplary embodiments, the timestamp may be indicative of creation time of the file. Additionally or alternatively, the timestamp may be indicative of modification time of the file, thus indicating that when modified the notation was still useful for its intended purpose. In some exemplary embodiments, the timeframe may be a month, a year or the like. In some exemplary embodiments, the timeframe may be based on rules, user preferences, or configurations. In some exemplary embodiments, the timeframe may be a function of maturity of the community, such that in a new field a relatively short timeframe may be used.

As another example, in a field in which there are relatively small number of available models, a long timeframe may be used.

In some exemplary embodiments, MRU and MWU may be computed based on user preference and community preference.

In some exemplary embodiments, MRU and MWU are popularity metrics that measure usage popularity of the notation in specified contexts within a relevant community, domain, affiliation or the like.

In some exemplary embodiments, ranking may be based MRU metric, MWU metric, additional metrics, combination thereof or the like. As an example, a text similarity metric may be used, such as using multiple Information Retrieval (IR) techniques, e.g. thesaurus construction, word association, semantic network or the like.

It will be noted that though Search Form 150 is depicted to have drop-down lists GUI elements for Ontological Category Field 152, Filter Field 154 and Ranking Field 156, other GUI elements may be used which may enable the user to make his selection between predetermined options. In some exemplary embodiments, the user may not be restricted to making a selection between predetermined options and may dynamically provide a different selection.

In some exemplary embodiments of the disclosed subject matter, in response to a selection by a user of a notation, one or more suggestions of related notations may be provided. As an example, a message stating that "other users who have used symbol S1 to denote A1, have also selected the following symbols: S2, S3, and S4, to denote A2, A3, and A4 respectively"). This can be attained by extracting all the symbols in the notation-base that match the same community (e.g., affiliation) filtered out to include only model authors who have also performed the same selection as the one triggering the recommendation. Additionally or alternatively, notations that are often used in combination may be given higher ranking in future searches, such that if a search for A2 is performed, the notation S2 is given higher ranking due to the previous selection of S1 to denote A1.

Figure 2:
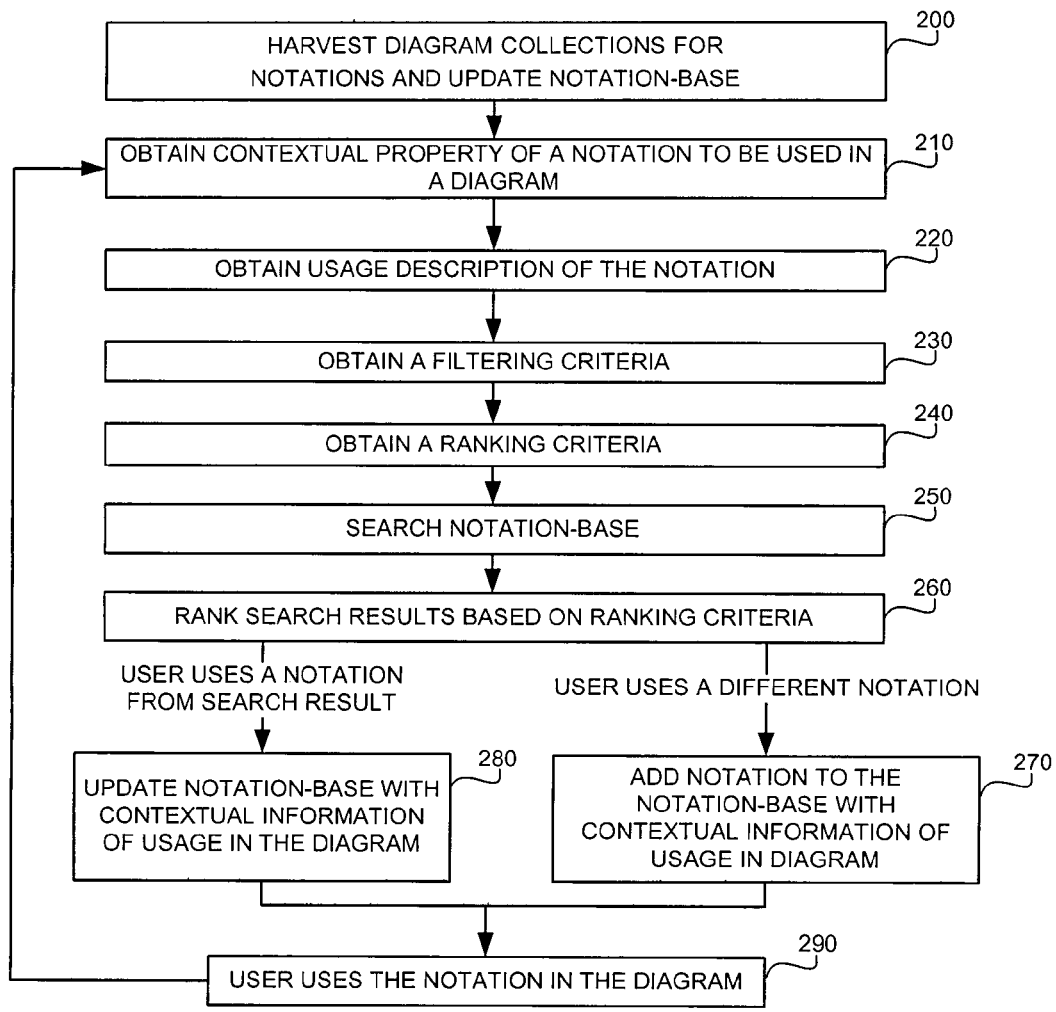
FIG. 2 shows a flowchart diagram of steps in a method for contextual-based notation selection, in accordance with some exemplary embodiments of the disclosed subject matter.

Referring now to FIG. 2 showing a flowchart diagram of steps in a method for contextual-based notation selection, in accordance with some exemplary embodiments of the disclosed subject matter.

In step 200, one or more diagram collections, such as available over the Internet 140, may be harvested for notations and their usage context. Accordingly, Notation-Base 110 may be updated.

In step 210, contextual property may be obtained relating to usage of a notation in a diagram. The contextual property may include affiliation, domain, underlying meaning, ontology of the underlying object, or the like. In some exemplary embodiments, contextual property may be obtained using one or more fields of Search Form 150, such as for example Ontological Category Field 152. Without loss of generality, step 220 depicts obtaining one form of contextual property.

In step 220, a usage description of the notation may be obtained. In some exemplary embodiments, usage description may be obtained using Identifying String Field 158.

In step 230, filtering criteria may be obtained, such as relating to a desired graphical property of the notation. Filtering criteria may be obtained using Filter Field 154.

In step 240, ranking criteria may be obtained, such as MRU, MWU, or the like. The ranking criteria may be obtained using Ranking Field 156.

In step 250, Notation-Base 110 may be searched for a notation matching the one or more criterions obtained in steps 210-230.

In step 260, the search results may be ranked based on the ranking criteria obtained in step 240. In some exemplary embodiments, the notations may be displayed in an order which is based on their respective ranking. Optionally, a rank of each notation may be displayed. In some exemplary embodiments, MWU/MRU metrics for each contextual property may be retained within Notation-base 110 and updated based on newly harvested diagrams (e.g., step 200) or interactive usage tracking (e.g., steps 280-270 depicted hereinbelow). In response to a search operation which requires some form of ranking, the applicable MWU/MRU metric may be retrieved and used. Additionally or alternatively, the applicable MWU/MRU metric may be computed dynamically in response to performing a search (e.g., step 250).

In case the user uses a notation from the search result in the diagram, step 280 may be performed. In step 280, Notation-Base 110 may be updated with contextual information of usage in the diagram and/or contextual information obtained from the user in steps 210-240.

In case the user uses a different notation not appearing in the search result, step 270 may be performed. In step 270, the notation may be added to Notation-Base 110 along with contextual information of usage in the diagram and/or contextual information obtained from the user in steps 210-240.

In step 290, the user uses the notation in the diagram.

In some exemplary embodiments, usage of the notation may be tracked and Notation-Base 110 may be updated accordingly. For example, whenever a model author chooses to include a symbol in his model (e.g., drag-and-drop), a pop-up screen may prompt the user to specify contextual properties of the used notation. The contextual properties may be, for example, the name of the selected symbol, its type, or the like. In some exemplary embodiments, some contextual properties may be gathered automatically. This may include: the filename of the model, the name of the machine on which the model was edited, geographic location, or the like. In some exemplary embodiments, automatically gathered contextual properties may be extracted based on usage of the notation in the model, such as by examining adjacent text labels. Optionally, automatically gathered contextual properties may be displayed for the user who may verify or modify them.

In case the user searches for an additional notation steps 210-290 may be repeated.

Figure 3:
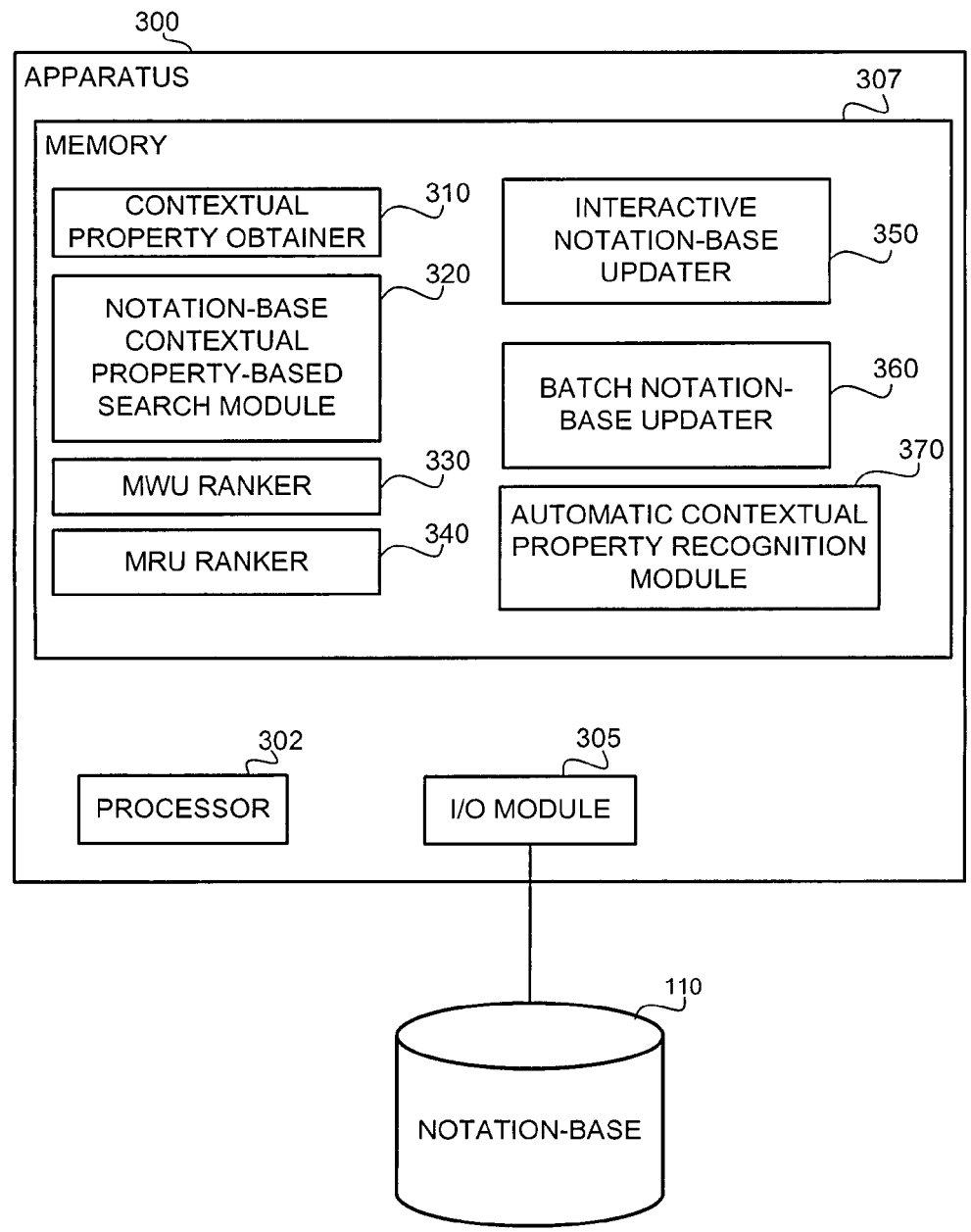
FIG. 3 shows a block diagram of components of a computerized apparatus useful for assisting a user in contextual-based notation selection, in accordance with some exemplary embodiments of the disclosed subject matter.

Referring now to FIG. 3 showing a block diagram of components of a computerized apparatus useful for assisting a user in contextual-based notation selection, in accordance with some exemplary embodiments of the disclosed subject matter.

In some exemplary embodiments, Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments, Apparatus 300 may comprise an Input/Output (I/O) Module 305 such as a receiver, transmitter, transceiver, modem, an input device, an output device or the like. In some exemplary embodiments, I/O Module 305 is utilized to connect to an I/O device for providing input by or output to a human user. I/O Module 305 may be operatively connected to a display, to a pointing device, a keyboard, or the like. It will however be appreciated that the system can operate without human operation. I/O Module 305 may be operatively connected to Notation-Base 110 thereby enabling Apparatus 300 to retrieve information stored in Notation-Base 110 and update said information.

In some exemplary embodiments, Apparatus 300 may comprise a Memory 307. Memory 307 may be computerized memory, such as persistent or volatile, or a combination thereof. For example, Memory 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory 307 comprises several memory devices, such as for example a RAM and a hard disk. In some exemplary embodiments, Memory 307 may retain program code operative to cause Processor 302 to perform acts associated with any of the steps shown in FIG. 2.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A Contextual Property Obtainer 310 may be operative to obtain one or more contextual properties relating to a required notation to be used in a diagram. In some exemplary embodiments, Contextual Property Obtainer 310 may be operative to display a GUI element, such as Search Form 150, which may be responsive to user's input.

A Notation-Base Contextual Property-Based Search Module 320, also referred to as Search Module 320, may be operative to perform a search in Notation-Base 110 to notations which are useable in a specified one or more contextual properties. In some exemplary embodiments, Search Module 320 may perform the searching operation of step 250.

A MWU Ranker 330 and MRU Ranker 340 may be operative to rank search results based on MWU or MRU metric, respectively. Ranking of step 260 may be performed using the MWU Ranker 330, MRU Ranker 340, combination thereof, or the like.

An Interactive Notation-Base Updater 350 may be configured to update Notation-Base 110 in accordance with a user's interactive activity with the Apparatus 300, such as selecting a notation from a result set or adding a new notation. In some exemplary embodiments, Interactive Notation-Base Updater 350 may be operative to perform steps 270-280.

A Batch Notation-Base Updater 360 may be configured to harvest diagram collections in order to enrich Notation-Base 110. Batch Notation-Base Updater 360 may extract notations utilized in the diagram, determine contextual properties of the notations, and update Notation-Base 110 accordingly. In some exemplary embodiments, Batch Notation-Base Updater 360 may be operative to perform harvesting of step 200.

An Automatic Contextual Property Recognition Module 370 may be configured to automatically determine one or more contextual properties of a notation based on its usage within a diagram. Automatic Contextual Property Recognition Module 370 may be utilized by Batch Notation-Base Updater 360 and/or Interactive Notation-Base Updater 350. In some exemplary embodiments, Automatic Contextual Property Recognition Module 370 may determine contextual properties based on metadata of the diagram, its retaining file, text labels used within the diagram, sibling diagrams stored within the same file, or the like.

In some exemplary embodiments, the disclosed subject may be an implementation of the non-limiting exemplary formal definition provided hereinbelow. In general form, the notation-base is a tuple (C, S, M, F, G) such that:

C is a set of contextual properties (e.g., is_a='car', type='vehicle', shape='round', color='red', size='10×20', affiliation='IBM');

S is a set of symbols (e.g., an icon of the shape of a vehicle);

M is a set of usage metrics (e.g., usage frequency); and

F and G are two sets of mapping functions.

Each function $f \in F$ is the contextual interpretation of a symbol such that $f: s \to c$ specifies for each symbol $s \in S$ a corresponding subset of contextual properties $c \subseteq C$ in the notation base.

Each function $g \in G$ is the usage interpretation of a symbol such that $g: s \to m$ specifies for each symbol $s \in S$ a corresponding subset of usage metric values for each metric $m \subseteq M$ In some exemplary embodiments, the notation-base may be accessed remotely (e.g., in a distributed environment). To support such settings, an Application Programming Interface (API) may be provided. The API may be, for example, as follows:

AddSymbol(s): insertion of a new symbol s to the notation-base S.

AddUsageMetric(s, m): the association of metric m to symbol s specified as a new function in G.

ClassifyAs(s, c): if not yet exists, the insertion of a new contextual property c into C and its association with symbol s specified as a new function in F.

SearchRankedBy(c, m): retrieves all the symbols in S that are associated with c in a function $f \in F$. The result is ordered according to the value of metric m.

UpdateMetrics(s, m): update the metrics m of a symbol s using function in G.

As an example, consider the harvesting process. Batch Notation-Base Updater 360 may receive as input a set of documents. Batch Notation-Base Updater 360 may utilize a parser for each document type (e.g., Micorsoft® Power-Point® files may be parsed using a different parser than PDF files). The parser identifies model diagrams and may associate with the diagram contextual properties such as author name affiliation, keywords from title, etc. The diagram is then parsed using a layout analysis algorithm to associate contextual properties to each symbol. The contextual properties vary between graphical features of the symbol such as color, shape, contour, positioning and textual features such as textual texts associated with the symbol, multiplicity, etc. For each identified symbol the parser invokes AddSymbol (s) (if needed), ClassifyAs (s, c), Update Metrics (s, m). At the end of the process a tuple (C, S, M, F, G) is available.

Interactive Notation-Base Updater 350 may provide a GUI element, such as Search Form 150, to enable user interaction. Search Module 320 may invoke the SearchRankedBy(c,m). Each user selection is recorded and augmented with contextual properties associated with the user, the user search criteria and additional optional contextual properties which the user can add (e.g., using an appropriate form). In response to the user selection the following may be invoked: AddSymbol (s) (if needed), ClassifyAs (s, c), Update Metrics (s, m), such that results from recurrent invocation of SearchRankedBy (c, m) will take into account the input from the user. Thus, in fact each selection of the user enriches the notation base—tuple (C, S, M, F, G) which may be shared by the user community.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as C#, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a processor, the method comprising:
   obtaining a contextual property of a notation to be used in a diagram, wherein the diagram is visual illustration comprising notations and adhering, at least loosely, to grammar of a modeling language, wherein the contextual property defines a context of a usage of the notation in the diagram with respect to the modeling language, and wherein the notation is a graphic symbol; and
   searching in a notation-base for notations, whereby a search result set is obtained, wherein the search result set comprises notations that were previously used in one or more diagrams in a similar context to the contextual property, wherein the one or more diagrams are visual illustrations adhering, at least loosely, to grammar of the modeling language, wherein the notation-base is stored in a data storage.

2. The computer-implemented method of claim 1, wherein the contextual property is selected from a group consisting of: affiliation of an author of the diagram, a domain of the diagram, and an ontological category of the notation.

3. The computer-implemented method of claim 2, wherein the ontological category of the notation is selected from a set of predetermined types of objects.

4. The computer-implemented method of claim 3 wherein the ontological category is selected from:
   an entity type of the diagram;
   a relationship type between entities of the diagram;
   an actor type in the diagram; and
   an event type occurring in the diagram.

5. The computer-implemented method of claim 1, wherein said searching is further based on a usage description of the notation, whereby the search result set comprises notations that were previously used in a similar diagram for a similar purpose.

6. The computer-implemented method of claim 1, further comprising ranking the search result set based on popularity of usage in accordance with a similar context to the contextual property.

7. The computer-implemented method of claim 6, wherein said ranking is performed in accordance with at least one of the following metrics:
   Most Widely Used (MWU) in the notation-base; and
   Most Recently Used (MRC) in the notation-based with respect to a timeframe.

8. The computer-implemented method of claim 1, further comprises filtering notations based on a visual characteristic of the notation.

9. The computer-implemented method of claim 1, wherein in response to a user's selection of a notation out of the search result set to be used in the diagram, updating the notation-base with usage information, whereby the notation-base is updated to reflect that the notation is used within the contextual property.

10. The computer-implemented method of claim 1, wherein in response to a user's determination to use a new notation instead of notations of the search result set, adding the new notation to the notation-base with usage information, whereby the notation-base is enriched with the new notation and is updated to reflect that the new notation is used within the contextual property.

11. The computer-implemented method of claim 1, further comprising obtaining a set of existing diagrams; and
   with respect to each existing diagram:
      determining contextual property of each utilized notation which is used in the existing diagram; and
      updating the notation-base to reflect usage of the utilized notation.

12. The computer-implemented method of claim 11, whereby the notation-base is updated to reflect accumulated collaborative contextual information regarding usage of notations in diagrams.

13. The computer-implemented method of claim 1, wherein the diagram is a formal model being defined using a visual modeling language.

14. A computerized apparatus comprising:
   a processor which is arranged to:
      obtain a contextual property of a notation to be used in a diagram, wherein the diagram is visual illustration comprising notations and adhering, at least loosely, to grammar of a modeling language, wherein the contextual property defines a context of a usage of the notation in the diagram with respect to the modeling language, and wherein the notation is a graphic symbol; and
      search in a notation-base for notations, whereby a search result set is obtained, wherein the search result set comprises notations that were previously used in one or more diagrams in a similar context to the contextual property, wherein the one or more diagrams are visual illustrations adhering, at least loosely, to grammar of the modeling language; and wherein the computerized apparatus is operatively coupled to the notation-base.

15. The computerized apparatus of claim 14, wherein the processor is configured to searching in the notation-base based on a usage description of the notation, whereby the search result set comprises notations that were previously used in a similar diagram for a similar purpose.

16. The computerized apparatus of claim 14, wherein said processor is further arranged to rank the search result set based on popularity of usage in accordance with a similar context to the contextual property.

17. The computerized apparatus of claim 16, wherein ranking is performed in accordance with at least one of the following metrics:

Most Widely Used (MWU) in the notation-base; and
Most Recently Used (MRC) in the notation-based with respect to a timeframe.

18. The computerized apparatus of claim 14, wherein said processor is arranged to update the notation-base with usage information in response to a user's selection of a notation out of the search result set to be used in the diagram, whereby said apparatus is configured to update the notation-base to reflect that the notation is used within the contextual property.

19. The computerized apparatus of claim 14, wherein said processor is arranged to add a new notation to the notation-base with usage information, in response to a user's determination to use the new notation instead of notations of the search result set, whereby said apparatus is configured to enrich the notation-base with the new notation and to update the notation-base to reflect that the new notation is used within the contextual property.

20. A computer program product comprising:

a non-transitory computer readable medium;

a first program instruction for obtaining a contextual property of a notation to be used in a diagram, wherein the diagram is visual illustration comprising notations and adhering, at least loosely, to grammar of a modeling language, wherein the contextual property defines a context of a usage of the notation in the diagram with respect to the modeling language, and wherein the notation is a graphic symbol;

a second program instruction for searching in a notation-base for notations, whereby a search result set is obtained, wherein the search result set comprises notations that were previously used in one or more diagrams in a similar context to the contextual property, wherein the one or more diagrams are visual illustrations adhering, at least loosely, to grammar of the modeling language, wherein the notation-base is stored in a data storage; and wherein said first, second, and third program instructions are stored on said non-transitory computer readable medium.

* * * * *